Patented June 8, 1937

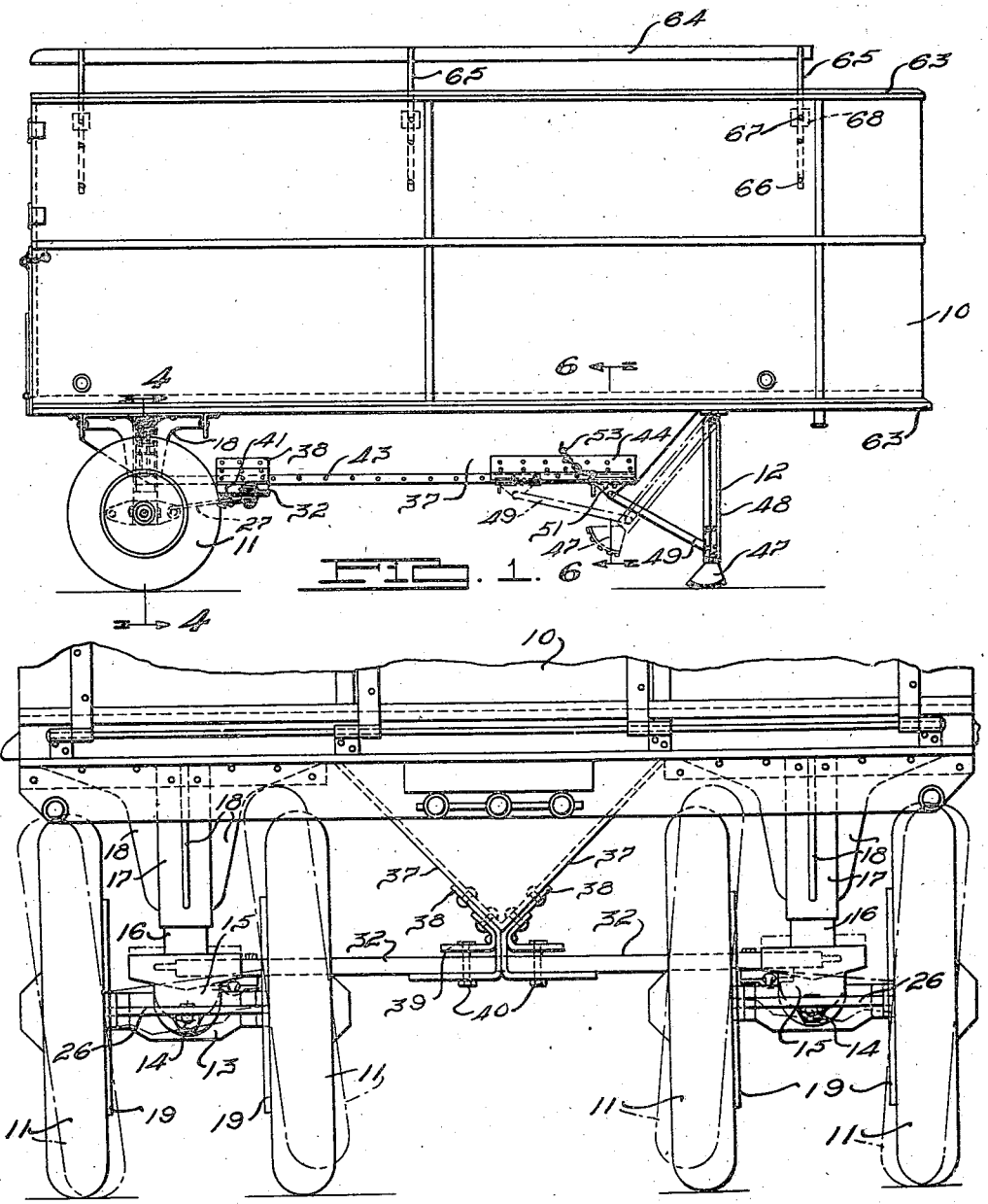

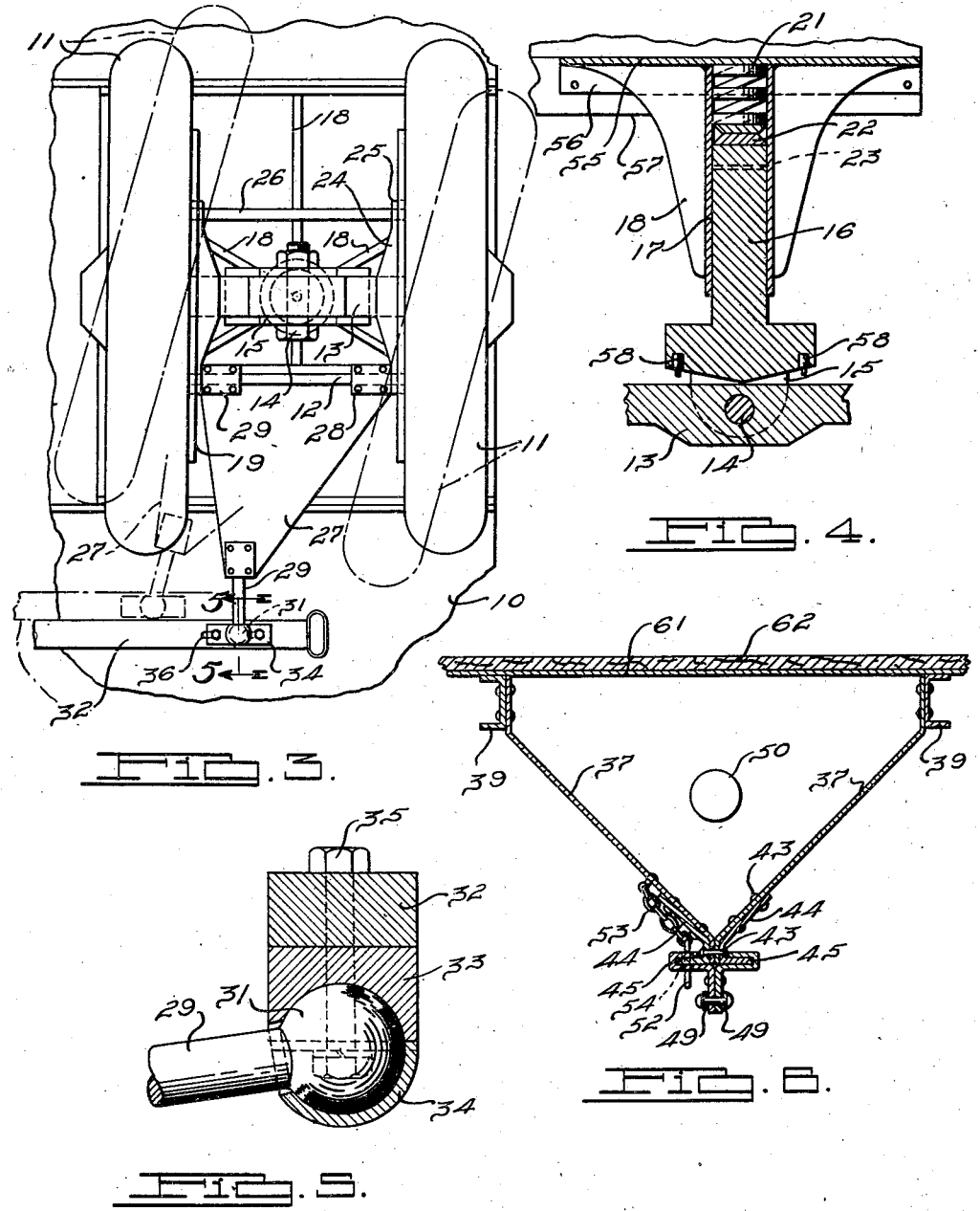

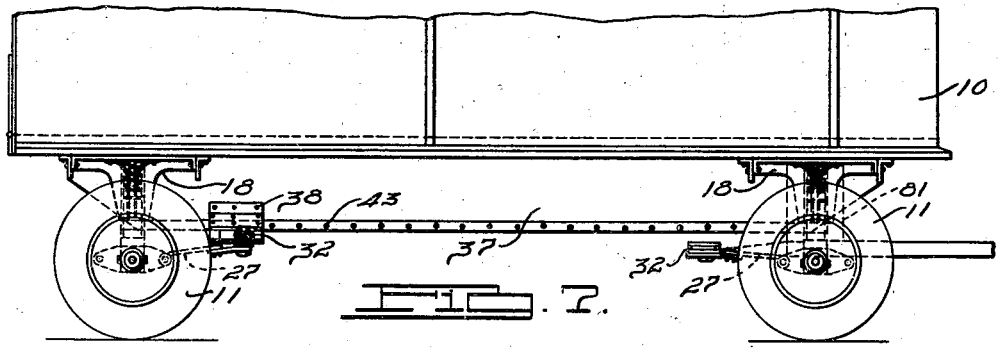
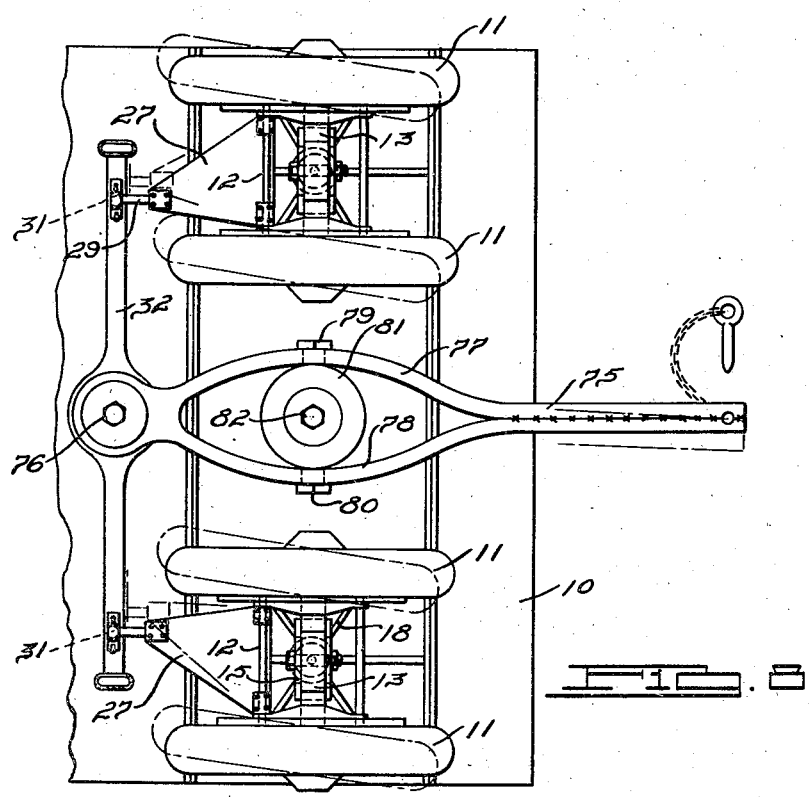

2,083,049

UNITED STATES PATENT OFFICE 2,083,049

TRAILER

Kenneth M. Byron, Detroit, Mich.

Application October 4, 1934, Serial No. 746,818

8 Claims. (Cl. 280—81)

My invention relates to vehicles and particularly to a trailer of the multi-wheel type and to the method of interconnecting the wheels and supporting the trailer thereon.

Trailers, trucks and other vehicles have been employed heretofore having adjacently disposed wheels which are rigidly mounted relative to each other on a supporting axle and must operate in unison when one or both of the wheels strike a raised object or depressed portion of the road. In this manner one tire takes the load two should carry and the life of the tires is materially shortened.

In practicing the present invention, I mount the wheels in pairs on a short axle which is pivotally supported medially of its ends on a turret, the piston of which operates in a cylinder to move longitudinally and rotate therein. The cylinder encompasses a spring while the piston has sealing means so that a cushion will be provided for the longitudinal movements of the piston in the cylinder both due to the compression of the air therein and due to the compression of the spring. When one of the wheels strikes an obstruction in the road it may be deflected upwardly about the other wheel as a center and will not of itself carry the other wheel from the ground as occurred heretofore in prior structures where one tire took the entire load at a point of contact with the obstruction.

The pairs of wheels are interconnected by a tie bar through sockets which are adjustable relative to the tie bar to position the wheels relative to each other and the vehicle. Means are provided for locking the tie bar in position with the wheels disposed longitudinally of the vehicle. When the tie bar is released it may be moved to one side or the other to turn the wheels at an angle for backing or parking purposes or for any other reason when it is desirable to turn the trailer sharply on a small radius. Material strength is provided to the vehicle frame by a V-shaped bracing element or fin extending the length of the vehicle to prevent it from sagging and to materially lighten its understructure. When desirable, switches may be provided on the turret supports for the trunnion axles by which a signal may be given to the driver of the propelling element, apprising him of the overloaded condition of the trailer or the fact that one of the tires is low or flat.

Accordingly, the main objects of the invention are to provide a trailer with pairs of wheels which are tiltable relative to each other; to provide a pair of wheels on a trunnion axle the central portion of which is pivoted to a turret; to provide wheels mounted on a turret which is movable in rotation and longitudinally; to provide a turret for supporting pairs of wheels having a piston sealed within a cylinder to compress the air and a spring disposed between the end of the cylinder and the piston to cushion the movement of the piston within the cylinder; to provide adjustable interconnecting means for the pairs of wheels by which the pairs are positioned and locked in place relative to the longitudinal dimension of the vehicle; to provide a tie bar connection between the pairs of wheels for turning or steering the wheels; to provide a V-shaped backing element or fin for the trailer body which extends the longitudinal length thereof to prevent sagging and to lighten the supporting structure therefor; to provide signal means for indicating when the truck is overloaded or a tire has become flat, and, in general, to provide a body which is materially simplified in construction and which is economical of manufacture.

Other objects and features of novelty of the invention will be either specifically pointed out or will become apparent when referring, for a better understanding of the invention, to the following description taken in conjunction with the accompanying drawings, wherein:

Figure 1 is a side view in elevation of a trailer embodying features of the invention.

Fig. 2 is an enlarged broken rear view of the trailer illustrated in Fig. 1,

Fig. 3 is an enlarged bottom plan view of one set of wheels illustrated in Fig. 2, Fig. 4 is an enlarged sectional view of the structure illustrated in Fig. 1, taken on the line 4—4 thereof;

Fig. 5 is an enlarged sectional view of the structure illustrated in Fig. 3, taken on the line 5—5 thereof, Fig. 6 is an enlarged sectional view of the structure illustrated in Fig. 1, taken on the line 6—6 thereof, Fig. 7 is a view similar to Fig. 1 but illustrating a trailer having wheels at the front similar to those at the back, and which may be steered by the drawbar, Fig. 8 is a plan view of the steering arrangement for the front wheels shown by Fig. 7.

In general, according to Fig. 1, a trailer body 10 is provided having wheels 11 at its rear end and a landing gear 12 at its front end. A power unit may be attached to the front end of the trailer and through the forward movement of the trailer the landing gear 12 will be released to have the front end of the trailer supported on the power unit with the load divided therebetween and the wheels 11 at the rear end of the unit. As illustrated more particularly in Fig. 2, two pairs of wheels 11 are employed at the sides of the rear end of the vehicle in aligned relation, which are interconnected to permit adjustment of the wheels relative to each other and to the trailer.

A trunnion axle 13 is pivoted centrally of its ends on a pivot 14 which projects through the bifurcated end 15 of a turret piston 16 which extends into a turret cylinder 17. The turret piston 15 is movable longitudinally within the cylinder 17 and is also rotatable therewithin. Flanges 18 are provided on the cylinder 17 to add strength thereto and to provide a support by which the trunnion cylinder is secured to the undercarriage of the trailer body 10. Two of the flanges extend longitudinally of the trailer while a pair of flanges extend laterally the sides of the cylinder, the ends of which are tapered to provide clearance for the wheels. The wheels 11 are secured in the usual manner to the end of the trunnion axle 13, and each wheel is provided with a brake drum mechanism 19 to have all four wheels of the truck subject to uniform braking power to prevent the swinging of the truck which would occur if the braking force is applied in any other manner.

The turret cylinder 18 has a spring 21 provided therein operating on bearing disc 22 which rests upon the head of the turret piston 16. Suitable sealing means such as a compression ring 23 or a plurality thereof are provided on the piston 16 for sealing the piston within the cylinder 17. In this manner the piston is cushioned within the cylinder both by the tension in the spring 21 and due to the compression of the air within the cylinder. The entire rear component of the load of the trailer is supported on the springs and the air cushion of the two turrets provided at the rear of the trailer. The air seal is also useful in preventing the piston from moving out of the cylinder when the wheel is unsupported on the ground in view of the vacuum created in the cylinder.

The spring load of the trailer is supported uniformly on the four wheels since the wheels are pivoted relative to each other so that upon one of the wheels striking an obstruction or an indentation in the road it may pivot relative to the other wheels to have both wheels continue to carry the load. This eliminates the possibility of one of the wheels taking all of the load as occurred when the wheels are rigidly mounted together which overloaded the tires and reduced their life, especially at the point subjected to immediate strain when striking the obstacle.

The trunnion axles 13 support frames 24 made up of elements 25 interconnected by rods 26. The front rods 26 have plates 27 supported thereon for pivotal movement by brackets 28. The front end of the plates 27 are provided with extending shanks 29 having balls 31 on their ends. A cross rod 32 interconnects the balls 31 extending forwardly of each pair of wheels, the balls are retained in recessed blocks 33 by plates 34 having a semi-circular indentation therein. The blocks 33 and plates 34 are supported by bolts 35 which are adjustable in slots 36 in the cross rod 32 and in this manner each pair of wheels may be adjusted separately and laterally with respect to the other pair and with respect to the rod 32. Thus the pairs of wheels may be aligned properly so as to run in parallel paths. The rod 32 has handles on its ends for pulling it and provides a means not only for holding the wheels in aligned positions but also for turning both pairs together and this is advantageous under certain circumstances where the trailer has to be turned sharply. It will be noted also that the balls 31 are disposed inwardly of the longitudinal center lines of the turrets, so that if the rod 32 is pulled laterally from one side of the trailer so as to turn the wheels, the pair of wheels at the same side of the trailer will actually turn through a slightly smaller arc than the other pair of wheels. This facilitates steering the wheels when the trailer is in motion as manifestly the pair of wheels turned the smaller amount will, in rolling on the pavement, describe a larger arc than the other pair.

The rod 32 is supported centrally by a V-shape fin 37 having a pair of angle bracket plates 38 and 39 secured thereto at each side of its apex portion; and for securing the rod in position, bolts 40 pass through horizontal leg portions of the brackets and through openings in the rod. As shown by Fig. 1, the rod passes laterally through a slot 41 formed in vertical web portions of the bracket plates 38, and this slot is of such length longitudinally of the trailer that considerable forward or backward movement of the rod in the slot may occur when the bolts are removed.

When the trailer is under a normal load, the trunnion axles 13 are approximately in the horizontal plane of the balls 31 and while the vertical positions of the axles may vary a little during movement of the trailer or as the load is varied, the construction is such that negligible forward or backward movement of the rod 32 is required during vertical oscillation or movement of the plates 27. While this movement of the rod is in fact negligible, if it should be a factor, the rod is sufficiently flexible to compensate for it. It may be noted also that during vertical tilting of either axle 13, the ball at the forward end of the plate 27 connected to the axle may tend to move vertically owing to the fact that it is offset laterally toward the trailer center from the median longitudinal line passing through the turret. The little movement of the ball in this manner is compensated for by sufficient flexibility of the end of rod 32 which is increased naturally in that it is only connected at its center to the rigid V shape fin. When the wheels are turned, after removing the bolts 40, the length of the slot 41 readily permits the necessary backward movement of the rod 32.

The construction described provides a very efficient arrangement for holding the two pair of dual wheels in proper alignment while still permitting their vertical movement, and enables turning or steering the wheels together very readily and easily. Pulling of the rod 32 when the trailer begins to move is facilitated considerably by the fact that the wheels adjacent the end of the rod pulled turn in a smaller arc than the other pair.

It may be noted also, that while the rod is held normally by bolts 40, other forms of releasable locks could be used and steering mechanism operable from the seat of the truck could be connected by suitable means, such as by a pinion and rack, so as to move the rod laterally when the wheels are to be turned. While the wheel arrangement is shown at the rear of the trailer, a similar arrangement could be employed at the front end of a trailer or the like, so that the driver could steer the wheels from his seat.

As shown by Fig. 6, the trailer body 10 is preferably built up on a plurality of longitudinally extending channel elements 42, the central pair of which are riveted to the V-shaped fin 37 for the purpose of adding longitudinal strength to the chassis construction. The plates comprising the fin are angularly disposed below the channels 42 to mate centrally of the body and are provided with downwardly extending flange portions joined together by a plurality of rivets 43. Also, at the front end of the fin additional strength is provided by plates 44 which are riveted to the mated flanges of the fin plates and to the sloping sides of the plates and which have laterally extending flanges 45 for the purpose of forming a track for positioning the landing gear 12. The fin is further useful in preventing the trailer from overrunning the power unit when moving down hill should the connecting link therebetween become loosened. The fin is further advantageous in enclosing a power brake mechanism 50 used to operate the brakes 19, so as to cover it from dirt and grime and protect it from damage from obstacles.

The landing gear 12 consists of a downwardly extending arm 46 having a foot 47 thereon which contacts the road and supports the front end of the trailer on the arm 46. A pair of links 49 interconnects the lower end of the arm 46 with a sliding shoe 51, illustrated more clearly in section in Fig. 6. The links 49 are pivoted to the shoe which is extended around the flange 45 in a position to slide therealong. Suitable means is provided for locking the shoe on the flanges 45, in the forward and rear positions shown, herein illustrated as a pin 52 attached to a chain 53. The pin extends through apertures 54 provided in the shoe 51 and the flange 45. In this manner the landing gear 12 is locked in raised position during the movement of the trailer and in load supporting position to prevent the movement of the trailer after the power unit is moved therefrom.

As illustrated more clearly in Fig. 4, the turret cylinder 18 is formed on a plate 55 having flanges 56 thereon which engage laterally extending angle elements 57 provided at the rear of the vehicle. Switches 58 may be employed in the base of the bifurcated ends of the turret piston 16 which are so disposed as to complete a contact when the trunnion axle 13 is in solid engagement with the base. The closing of the switch signals the driver of the power unit that a tire is flat or that the trailer is overloaded and that the load is unevenly distributed on the pairs of wheels.

A further novelty in the construction resides in the employment of a rust-proof plate 61 on the underside of the floor 62 for the purpose of preventing any water reaching the floor from the underside of the vehicle. In this manner, greater life is provided for the trailer and the latter is always retained perfectly dry and free from moisture which might otherwise pass through the floor.

The body of the trailer is further strengthened both at the top and at the bottom by rub rails 63 which project beyond the sides of the body to prevent the sides from being damaged. A ridge pole 64 is provided at the top of the trailer and is mounted on supports 65 which are adjustable for the purpose of having the pole extend variable distances above the top of the trailer body. Suitable clamping means are provided for positioning the supports at various heights, such as a plurality of apertures 66 engageable selectively by a pin 67 in the supporting plate 68.

In the construction shown by Figs. 7 and 8, wheels are provided at the front end of the trailer like those at the rear, except that the plates 27 and the tie bar 32 are at the rear side of the wheels. The front wheels instead of being manually turned by adjusting the tie bar, are turned as the truck or power unit pulling the trailer turns, and this is accomplished by using a draw bar 75 which is pivotally connected to the tie bar as indicated at 76. Intermediate its ends the draw bar may have laterally spaced portions 77 and 78 pivotally engaging trunnions 79 and 80 projecting from a fifth wheel 81 on the trailer body so that vertical tilting of the draw bar may be permitted when necessary. The fifth wheel is journalled on the trailer body for turning movement in a horizontal plane about a vertical pin or axis 82 which is transversely aligned with the trunnion axles. Preferably, the rear end of the draw bar and the central portion of the tie bar are enlarged to provide large contacting surfaces so as to stabilize the connection between the bars.

When the front end of the draw bar is moved laterally during turning of the truck or unit connected to the trailer, the rear end of the draw bar moves oppositely and turns the wheels so that the trailer turns with the truck or unit. It is to be noted particularly that the distance between the pivotal points 76 and 82 is substantially the same as the distance between the balls 31 and the turret pistons 16 so that the tie bar remains substantially parallel to the position shown during longitudinal and transverse shifting of the bar when the wheels are turned. The inwardly offset positions of the balls relative to the longitudinal and median line of the turrets 16 may cause slight transverse angling of the tie bar but this is practically unnoticeable.

The V shape back 37 in this construction may be extended to the front end of the trailer, thereby still further increasing the strength of the frame structure. In view of the draw bar and tie bar connection, it is not necessary to support the tie bar on the V-shape back as provided for in connection with the rear wheels although supports readily could be provided on the back to hold the tie bar against falling while still permitting movement of the bar during steering.

Although more than one form of the invention has been described and illustrated in detail, it will be apparent to those skilled in the art that various modifications may be made without departing from the scope of the appended claims.

I claim as my invention:

1. A vehicle comprising a frame, a pair of wheels at each side of the frame, means supporting each pair of wheels so as to permit turning thereof in a horizontal plane and also vertical movement thereof together with respect to the frame, and transversely movable means for turning both pairs of wheels simultaneously and including arms pivotally connected to the pairs of wheels, respectively, for pivotal movement in vertical planes.

2. A vehicle comprising a frame, a pair of wheels at each side of the frame, means supporting each pair of wheels so as to permit turning thereof in a horizontal plane and also vertical movement thereof together with respect to the frame, an arm pivotally and operatively connected to each pair of wheels for pivotal movement in a vertical plane, a transversely extending and wheel adjusting bar, and a universal connection between each arm and the bar, whereby each pair of wheels may move vertically with respect to the bar without any substantial interference.

3. A vehicle supported on pairs of aligned wheels, axles for interconnecting each pair of wheels, means for supporting said axles for turning movement, a projection pivotally connected to each of said axles, a cross member adjustably secured to said projections, and means for securing said cross member in desired position.

4. A vehicle supported on pairs of aligned wheels, axles for interconnecting each pair of wheels, means for supporting said axles for turning movement, a projection pivotally connected to each of said axles for pivotal movement in a plane substantially normal to the plane of said axles, a cross member adjustably secured to said projections, and means for securing said cross member in desired position.

5. A vehicle supported on pairs of aligned wheels, axles for interconnecting each pair of wheels, means for supporting said axles for turning movement, a projection pivotally connected to each of said axles, a cross member adjustably secured to said projections, means for independently adjustably securing said projection to said cross member, and means for securing said cross member in desired position.

6. A vehicle comprising a frame supported on pairs of aligned wheels, means supporting each pair of wheels so as to permit turning thereof in a horizontal plane and also vertical movement thereof with respect to said frame, an arm pivotally and operatively connected to each pair of wheels for pivotal movement in a vertical plane, a cross member, and an adjustable universal connection between each arm and said cross member.

7. A vehicle comprising a frame, a pair of wheels at each side of the frame, means supporting each pair of wheels so as to permit turning thereof in a horizontal plane, and also vertical movement thereof together with respect to the frame, an arm pivotally and operatively connected at one end to each pair of wheels for pivotal movement in a vertical plane, and means for pivotally mounting the other end of the arm on the frame.

8. A vehicle comprising a frame, a pair of wheels at each side of the frame, means supporting each pair of wheels so as to permit turning thereof in a horizontal plane, and also vertical movement thereof together with respect to the frame, an arm pivotally and operatively connected at one end to each pair of wheels for pivotal movement in a vertical plane, and means adjustably mounting the other end of the arm on the frame for transverse adjustment so that each pair of wheels may be aligned longitudinally with the frame.

KENNETH M. BYRON.